United States Patent [19]

Maskalick

[11] Patent Number: 4,460,444

[45] Date of Patent: Jul. 17, 1984

[54] HYDRIODIC ACID-ANODE-DEPOLARIZED HYDROGEN GENERATOR

[75] Inventor: Nicholas J. Maskalick, Pittsburgh, Pa.

[73] Assignee: Westinghouse Electric Corp., Pittsburgh, Pa.

[21] Appl. No.: 482,735

[22] Filed: Apr. 6, 1983

[51] Int. Cl.$^3$ ............................ C25B 1/04; C25B 1/24
[52] U.S. Cl. .................................... 204/129; 204/128; 423/486; 423/539; 423/579; 423/580; 423/645
[58] Field of Search ...................... 204/104, 129, 128; 423/572, 486, 645, 580, 579, 539–540

[56] References Cited

U.S. PATENT DOCUMENTS

| | | |
|---|---|---|
| 448,541 | 3/1891 | Parker et al. ........................ 204/128 |
| 3,291,708 | 12/1966 | Juda .................................... 204/128 |
| 3,888,750 | 6/1975 | Brecher et al. ..................... 204/129 |
| 4,059,496 | 11/1977 | Schulton et al. .................... 204/104 |
| 4,164,457 | 8/1979 | Barnert et al. ...................... 204/129 |

Primary Examiner—R. L. Andrews
Attorney, Agent, or Firm—D. P. Cillo

[57] ABSTRACT

Hydrogen is recovered from aqueous hydriodic acid in the presence of sulfuric acid, in an electrolysis cell having an anode and cathode compartment separated by a hydrogen ion permeable membrane, by electrochemically liberating iodine in the anode compartment by anodization of iodide anions, and electrochemically generating hydrogen in the cathode compartment from hydrogen cations that migrate across the membrane.

10 Claims, 4 Drawing Figures

HYDRIODIC ACID-ANODE-DEPOLARIZED HYDROGEN GENERATOR

BACKGROUND OF THE INVENTION

Petrochemical processing is presently employed to produce most hydrogen gas. This method, however, depletes valuable natural resources. Water electrolysis cells are also sometimes used for the purpose of generating hydrogen gas, in selected areas where electricity is abundant and inexpensive. However, when water is electrolyzed, more energy is used than will be regained when evolved hydrogen is burned later. Recently, there have been attempts to solve these energy problems, since the demand for hydrogen gas as a clean fuel in fuel cells and gas turbines and as a petrochemical feedstock is expected to dramatically increase.

Brecher et al., in U.S. Pat. No. 3,888,750, taught the production of hydrogen gas via $SO_2$-anode-depolarized electrolysis of water, utilizing aqueous sulfuric acid as the electrolyte in an electrolyzer. There, water and $SO_2$ are supplied to the electrolyzer to produce $H_2SO_3$. The $H_2SO_3$ is electrochemically oxidized to form $H_2SO_4$, while $H_2$ is produced at the cathode, according to the overall reaction:

$$2H_2O + SO_2 \rightarrow H_2 + H_2SO_4 \tag{I}$$

The $H_2SO_4$ is drawn off, concentrated by evaporation, and then catalytically decomposed at about 870° C. in a reduction reactor to form $H_2O$, $SO_2$ and $O_2$.

One of the advantages of this method is that a large portion of the energy input could be supplied from a source of industrial process heat, reducing electrical costs. One of the main difficulties with this approach, however, is that $SO_2$ reactant solubility is low, affecting the rate of reaction during electrolysis. Also, increasing the $H_2SO_4$ concentration serves to drive the reaction backward, so that relatively low $H_2SO_4$ concentrations must be used. This requires a large energy input to concentrate drawn-off dilute $H_2SO_4$, which is then decomposed to form $H_2O$ and $SO_2$, for recycle back to the electrolyzer. Later, Schulten et al., in U.S. Pat. No. 4,059,496, and Barnert et al., in U.S. Pat. No. 4,164,457, used minor amounts of HI (hydriodic acid) as a catalyst for the electrochemical oxidation of $SO_2$ in reaction (I), to improve $H_2$ production. This, however, did not solve problems of $SO_2$ solubility, and still required use of low $H_2SO_4$ concentrations.

SUMMARY OF THE INVENTION

The above problems have been solved by eliminating $SO_2$ as the anode depolarizer in the electrolysis reaction, and completely substituting major amounts of HI (hydriodic acid), according to the reaction:

$$2HI\ (aq.) \xrightarrow{\text{in presence of } H_2SO_4\ (aq.)} H_2 + I_2\ (aq.\ sol.) \tag{II}$$

The aqueous $H_2SO_4$ (sulfuric acid) is fed into the electrolyzer with aqueous HI, and is drawn off with $I_2$ in aqueous solution.

This $H_2$ generation, via electrolysis of aqueous hydriodic acid, proceeds at a low cost of electrical energy in a concentrated $H_2SO_4$ medium. Here, proton activity is influenced by aqueous $H_2SO_4$ as well as by aqueous HI. The benefits of this approach are: HI reactant solubility is high, compared to $SO_2$, the strong chemisorption of halide ion leads to rate increases of the electrode reactions, and increasing the $H_2SO_4$ concentration drives the reaction forward, so that concentrations of $H_2SO_4$ as high as 80 wt.% can be employed. Additionally, much less energy is required to concentrate drawn off $H_2SO_4$ by evaporation.

Outside of the electrolysis system, $SO_2$ can be used to regenerate aqueous HI from the $I_2$ in solution. A large part of the energy requirements of evaporation, regeneration, and the like, can, as in the Brecher et al. process, be supplied from a source of waste industrial heat (such as a high temperature fuel cell or a nuclear reactor), supplanting electrical costs. The critical change from using $SO_2$ in the electrolysis to using HI in the electrolysis permits more effective electrolyzer operation, bringing this type of process much closer to practical commercial operation.

BRIEF DESCRIPTION OF THE DRAWINGS

For a better understanding of the invention, reference may be made to the preferred embodiments, exemplary of the invention, shown in the accompanying drawings, in which.

DESCRIPTION OF THE PREFERRED EMBODIMENTS

Figure 1:
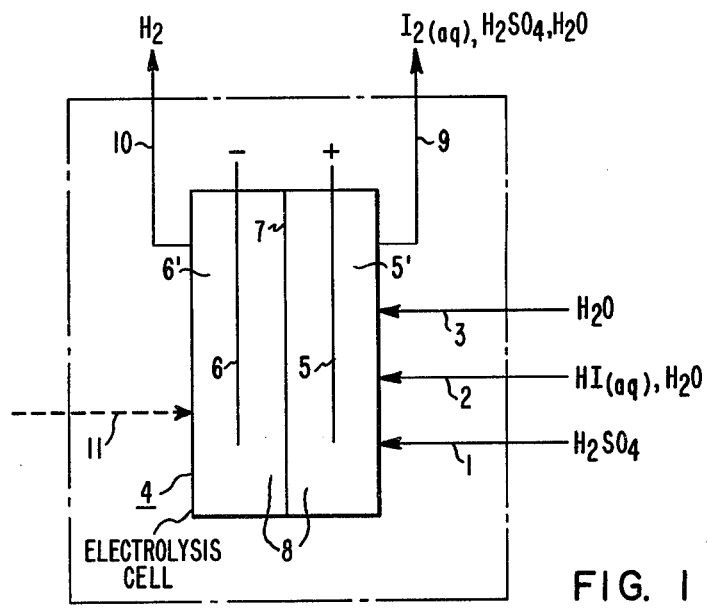
FIG. 1 is a flow chart of one embodiment of the electrolyzer cell system of this invention.

Referring now to FIG. 1 of the drawings, aqueous sulfuric acid ($H_2SO_4$) from stream 1, aqueous hydriodic acid (HI) containing hydrogen cations and iodide anions from stream 2, and water from stream 3, are fed separately or through a combined feed stream into the anode compartment 5' of electrolysis cell 4. The electrolysis cell system, enclosed by the dashed lines, comprises, preferably, a pressure tight, acid resistant vessel, containing a positive electrode 5, anode, and a negative electrode 6, cathode, across which an appropriate d.c. potential is impressed from an electrical energy source, such as a d.c. generator, not shown.

The electrodes are made of an acid resistant material, such as lead-based material, platinum, or conductive carbon. The electrodes must contain a suitable catalyst, such as platinum or be made of platinum. A porous membrane 7, preferably a permeable membrane selective to hydrogen ions, is disposed in concentrated $H_2SO_4$ electrolyte 8, to form anode compartment 5' and cathode compartment 6'.

In the method of this invention, iodine ($I_2$) is electrochemically liberated by anodization, i.e., anodic oxidation of iodide anions in the anode compartment 5' accompanied by a migration of hydrogen cations across membrane 7, into the cathode compartment 6'. Iodine $H_2SO_4$ and water are removed from the anode compartment 5' through exit stream 9, and hydrogen gas is electrochemically generated at the cathode 6 from migrating hydrogen cations that pass through membrane 7. All of the above reactions and ion displacement takes place essentially simultaneously and continuously.

Hydrogen gas, derived from the cathode compartment, exits through stream 10 and is then passed to a collector, not shown. The electrolysis cell operates at a temperature of from about 20° C. to about 70° C. In order to maintain all of the HI in the anode compartment, if a porous membrane 7 is used instead of a selective cation exchange membrane, aqueous $H_2SO_4$ can be fed into the cathode compartment, through stream 11, shown as a dashed line, at a slight pressure, to maintain a pressure differential in favor of the cathode.

Figure 2:
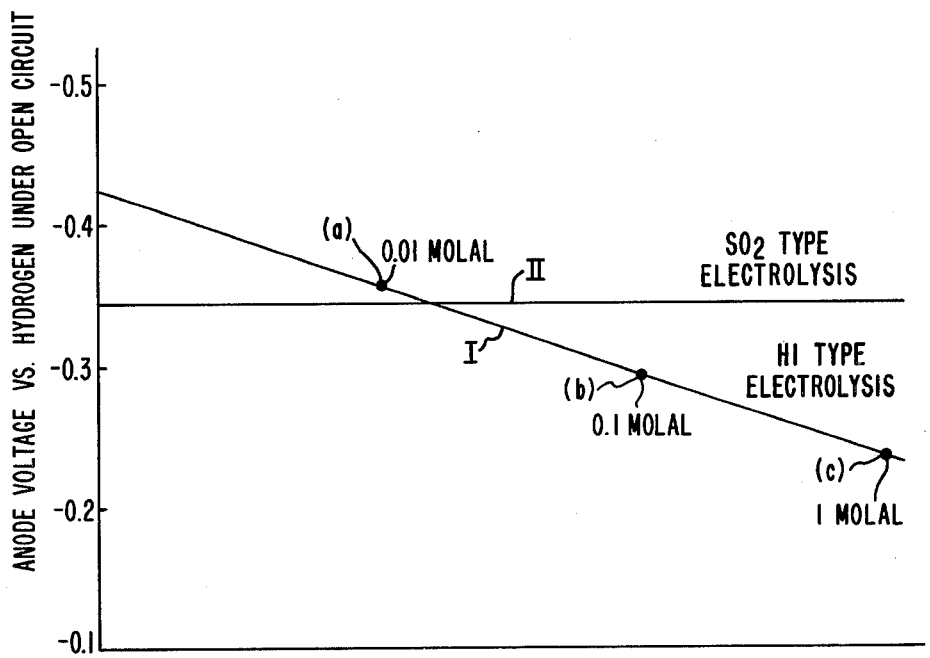
FIG. 2 is a comparative graph of open circuit voltage for electrolysis reactions using $SO_2$ and HI in 50 wt.% $H_2SO_4$.

One of the main reactions taking place in the electrolyzer cell system is:

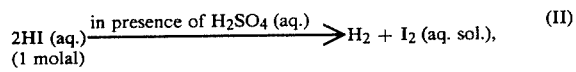

where the open circuit voltage (dynamic hydrogen electrode under open circuit conditions) is 0.24 for 50 wt.% $H_2SO_4$, and approaches 0 for 70 wt.% $H_2SO_4$. FIG. 2 of the drawings shows the comparative, theoretical, open circuit voltage curves for electrolysis reactions using aqueous HI in 50 wt.% $H_2SO_4$, curve I, at 0.01; 0.1; and 1 molal HI, points (a); (b); and (c) respectively, vs. the electrolysis reaction using $SO_2$ in 50 wt.% $H_2SO_4$, curve II. As can be seen, the open circuit voltage for the HI type electrolysis is substantially lower than the $SO_2$ type electrolysis above about 0.03 HI molality. In actual operation, since $SO_2$ is relatively insoluble in aqueous $H_2SO_4$, curve II will have a higher working voltage value than shown. FIG. 2 shows that less voltage is required for over about 0.03 molal HI type electrolysis, at equivalent current densities, with resultant substantial energy savings in the HI type electrolysis cell.

This method recognizes that the oxidation of aqueous HI to $I_2$ can be made to a fundamental process occurring at the anode. Here, $SO_2$ is not employed in the electrolyzer cell at all. In this method, HI is not used solely as a catalyst, but is added in major amounts as a main reactant. The anode reaction is:

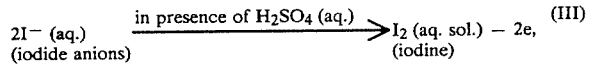

and the cathode reaction is:

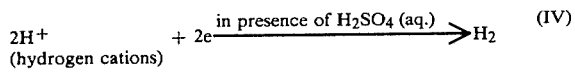

The concentration of the aqueous hydriodic acid can be from about 0.03 to about 2.0 molal, preferably from about 0.3 to about 1 molal; where the molality of a solution is the number of moles of solute per kilogram of solvent contained in the solution. The concentration of aqueous $H_2SO_4$ as electrolyte, and feed into the electrolysis cell can be from about 40 wt.% to about 80 wt%, preferably from about 45 wt.% to about 60 wt.%. For these concentration ranges, i.e., about 0.03 to about 2.0 molal HI and about 40 wt.% to about 80 wt.% $H_2SO_4$, the weight ratio of $(HI):(H_2SO_4)$ can range from about (1):(1.5 to 200), preferably from about (1):(5 to 20). A ratio of 1:200 is above a catalytic amount of HI, and in this quantity HI is still a major reactant. For 80 wt.% $H_2SO_4$, and a 1:over 200 ratio, there will be spontaneous decomposition of HI in the anode compartment. For 40 wt.% $H_2SO_4$, and a 1:under 1.5 ratio, there will also be spontaneous decomposition of HI in the anode compartment. Under 40 wt.% $H_2SO_4$, excess power is needed to produce $H_2$ gas, and excess energy is dissipated elsewhere in the process to accomplish water vaporization.

Figure 3:
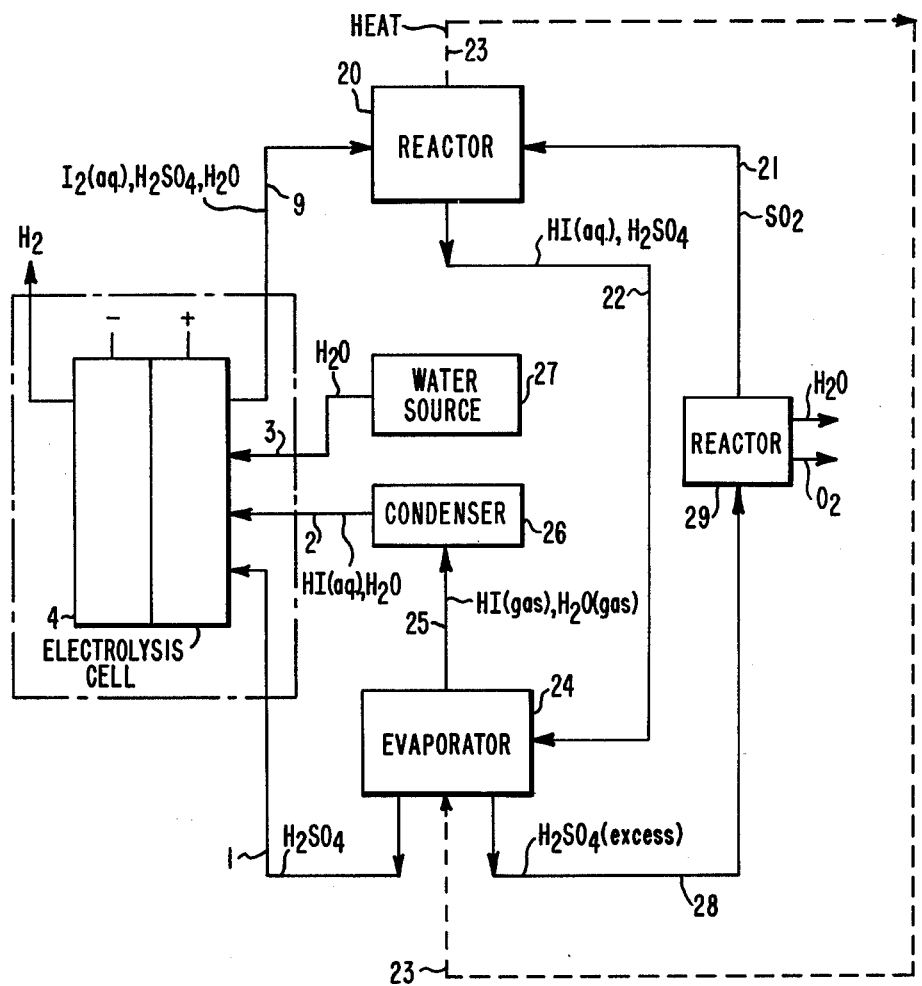
FIG. 3 is a flow chart of one embodiment of the complete cycle of reactant processing outside of the electrolyzer cell.

Referring now to FIG. 3 of the drawings, which relates to reactant processing outside the electrolyzer cell of the invention, the aqueous $I_2$, $H_2SO_4$ and water exiting electrolysis cell 4 through stream 9, are fed into a separate reactor 20, such as a high-surface area bubble column. In reactor 20, $SO_2$ gas from stream 21 is mixed with the stream 9 ingredients, to regenerate HI as an aqueous solution, which exits reactor 20, along with $H_2SO_4$, in stream 22.

The $SO_2$ reaction with $I_2$ in reactor 20 is highly exothermic, with a heat of reaction of 52,640 calories per mole of $I_2$. This heat of reaction energy, shown as broken line 23, can be effectively employed to supply some of the heat needed for the distillation of HI in the distillation column or evaporator 24, as part of the recovery, recycling process. As it is, the energy input requirements of evaporator 24 are much lower than prior art processes, because the $H_2SO_4$ exiting through stream 1 can be highly concentrated; therefore it is not necessary to expend major amounts of heat to drive off large volumes of water.

Gaseous HI and $H_2O$ exiting evaporator 24 through stream 25 are fed into condenser or holding vessel 26, and exit as aqueous HI and $H_2O$, which are then fed into the electrolysis cell 4 through stream 2. A makeup water source 27 is also shown. The number of moles of water added will be equal to the number of moles of hydrogen gas produced at the cathode. A minor amount of $H_2SO_4$, i.e. about 2 to 15 vol.%, exits the evaporator 24 through stream 28, and is fed into a $SO_2$ regenerator reactor 29, where $H_2SO_4$ is decomposed to form $H_2O$ and $SO_3$, and where the $SO_3$ is further cracked to produce $O_2$ and $SO_2$ at about 870° C. The heat energy required for this decomposition reaction can be supplied, at least in part, by an in-place high temperature fuel cell system, nuclear reactor, or a solar heat collector. The major amount of $H_2SO_4$ exiting the evaporator is fed back into the electrolysis cell through stream 1.

The following example further illustrates the invention:

EXAMPLE 1

A glass vessel, 12 cm. in length and 8 cm. in diameter, was employed as the basic structure for the electrochemical electrolysis cell. This glass vessel was fitted with a welded-in, glass frit disk, 8 cm. in diameter and 0.5 cm. in thickness, which divided the anode electrolyte (50 wt.% $H_2SO_4$+HI) from the cathode electrolyte (50 wt.% $H_2SO_4$), acting as a $H^+$ ion permeable membrane. A platinum screen, approximately 24 cm.[2] in projected area, and 12.5 cm.[2] in surface area, contacted each side of the glass frit, one screen serving as a catalytic anode, and the other as a catalytic cathode. Instrumentation was led into each end of the glass vessel via fittings in Teflon stoppers. Voltage readings for each electrode were referenced to $Hg/Hg_2SO_4$ electrodes in 50 wt.% $H_2SO_4$, with Luggin capillaries placed near the working platinum electrodes.

Teflon pumps, designated Saturn SP-4000-2, with variable flow controls were employed to pump either anode or cathode electrolyte in a closed circuit from respective reservoirs, through the cell compartment and back again. Manometer readouts responded to pumping rates, which were adjusted to maintain a pressure differential of approximately one inch of water in favor of the cathode. Net flow, therefore, was from cathode to anode, keeping the HI component in the electrolyte essentially on the anode side.

The cell was operated by contacting the platinum screen electrodes with the leads from a d.c. power supply, and driving the electrodes at various constant current levels from 1 mA. to approximately 8 A. Readings were taken of anode voltage-to-reference, cathode voltage-to-reference, and total cell voltage at each level of driving current. During operation, iodine was electrochemically liberated by anodic oxidation of iodide anions in the presence of sulfuric acid, hydrogen cations migrated across the $H^+$ ion permeable membrane, and hydrogen gas was electrochemically generated at the cathode in the presence of sulfuric acid.

Figure 4:
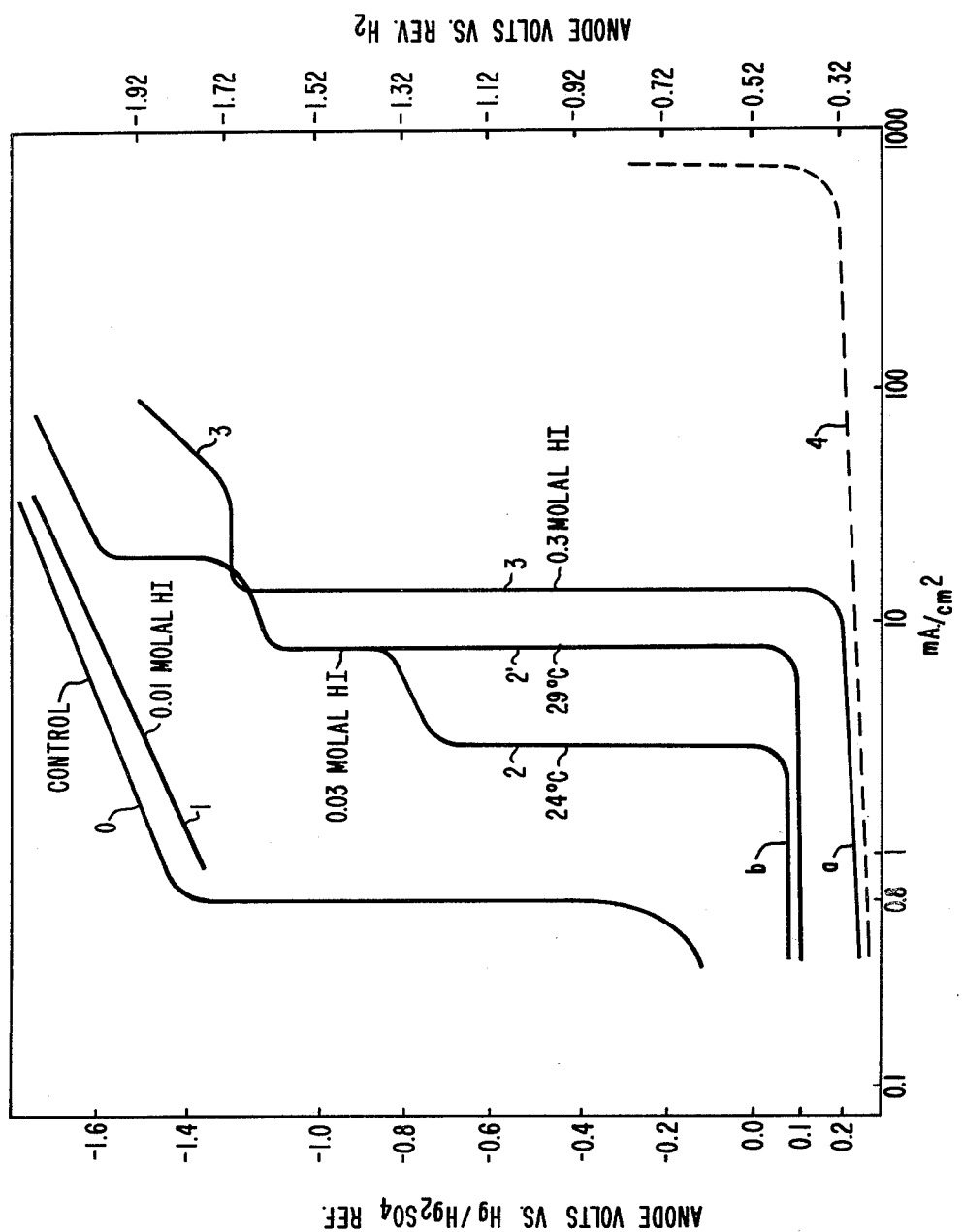
FIG. 4 is a comparative graph showing polarization curves in relation to limiting current for the samples of Example 1.

Four experiments involving evaluation of the effect of HI concentration in 50 wt.% $H_2SO_4$ were run, with the electrolysis cell operating at from 23° C. to 30° C.: HI concentration=0 molal (Control) at 24° C.; 0.01 molal HI (comparative Sample 1) at 25° C.; 0.03 molal HI (Sample 2) at 24° C. and 29° C.; and 0.3 molal HI (Sample 3) at 25° C. and 30° C. The results of these experiments are shown in FIG. 4, as a graph of current density plotted against anode voltage vs. a $Hg/Hg_2SO_4$ reference electrode (left side of the graph) and a working hydrogen electrode (right side of the graph). The weight ratio of HI:$H_2SO_4$ for 50 wt.% $H_2SO_4$ and each of 0.01; 0.03; and 0.3 molal HI was about 1:385; 1:125; and 1:12, respectively, insuring, in the last two instances, that HI was a main reactant in the electrolysis reaction.

As can be seen from FIG. 4, both the Control (0 molal HI) and comparative Sample 1 (0.01 molal HI) showed a very low limiting current density of about 1 mA./cm.$^2$, curves 0 and 1, respectively. By increasing HI concentration to 0.03 molal (Sample 2) and 0.3 molal (Sample 3), limiting current jumped to about 10 mA./cm.$^2$ and 12 mA./cm.$^2$, respectively, curves 2 and 3, respectively, showing a dramatic improvement. Curve 2 shows 0.03 molal at 24° C., curve 2' shows 0.03 molal at 29° C., and curve 3 shows 0.3 molal at both 25° C. and 30° C., both temperatures providing approximately the same values.

All of these values are low, however, because anode polarization increased rapidly due to the formation of an iodine passivation layer on the platinum screen electrodes during electrolysis cell operation. This passivation layer became insulating, and after a while prevented further formation of $I_2$ in reaction (III) hereinabove. This eventually led to undesirable side reactions, possibly providing $I^+$, $HIO_3$, and $HIO_4$.

With an electrolysis cell as shown in FIG. 1, where a much larger volume of $H_2SO_4$ is circulated, and where exiting stream 9 removes $I_2$ (aq.) from the anode compartment, the passivating film would not have an opportunity to form. A higher surface area electrode would also help to solve the insulating film problem. In a cell such as shown in FIG. 1, using 0.9 molal HI and 50 wt.% $H_2SO_4$, and operating at 25° C., current density values approaching 950 mA./cm.$^2$ should be obtainable at about −0.3 volts vs. a working hydrogen electrode, as shown by the dotted line curve 4 in FIG. 4. Even more improved results would be obtainable at higher $H_2SO_4$ concentrations. The results of FIG. 4 do show, however, the usefulness of HI in concentrations over about 0.03 molal as the sole anode depolarizer in an electrolyte for $H_2$ generation. In FIG. 4, the lower the voltages in the curves, such as voltage a vs. voltage b, $H_2$ is produced with less power applied and energy consumed.

I claim:

1. A method of recovering hydrogen gas in an electrolysis cell having an anode and a cathode, said anode and cathode being separated by a hydrogen ion permeable membrane to form an anode compartment containing the anode and a cathode compartment containing the cathode respectively, each compartment containing aqueous sulfuric acid, which method comprises:

feeding an aqueous solution consisting essentially of aqueous hydriodic acid, containing hydrogen cations and iodide anions, and aqueous sulfuric acid, to the anode compartment of said electrolysis cell;

electrochemically liberating iodine by anodization of said iodide anions in the anode compartment in the presence of aqueous sulfuric acid, accompanied by a migration of said hydrogen cations across the hydrogen ion permeable membrane to the cathode compartment;

electrochemically generating hydrogen gas at the cathode, in the presence of aqueous sulfuric acid, from said hydrogen cations;

removing iodine from the anode compartment; and removing and collecting hydrogen gas from the cathode compartment.

2. The method of claim 1, where the aqueous hydriodic acid has a concentration of from about 0.03 molal to about 2.0 molal.

3. The method of claim 2, where the aqueous sulfuric acid has a concentration of from about 40 wt.% to about 80 wt.%.

4. The method of claim 3, where the weight ratio of HI:($H_2SO_4$) is from about (1):(1.5 to 200).

5. A method of recovering hydrogen gas in an electrolysis cell having an electrical energy source and an anode and a cathode, said anode and cathode being separated by a hydrogen ion permeable membrane to form an anode compartment containing the anode and a cathode compartment containing the cathode respectively, each compartment containing aqueous sulfuric acid, which method comprises:

adding an aqueous mixture consisting of: aqueous hydriodic acid having a concentration of from about 0.03 molal to about 2.0 molal and consisting of hydrogen cations and iodide anions; aqueous sulfuric acid; and water to the anode compartment of said electrolysis cell;

electrochemically liberating iodine by anodization of said iodide anions in the anode compartment in the presence of aqueous sulfuric acid, accompanied by a migration of said hydrogen cations across the hydrogen ion permeable membrane to the cathode compartment;

electrochemically generating hydrogen gas at the cathode, in the presence of aqueous sulfuric acid, from said hydrogen cations;

removing iodine from the anode compartment; and removing and collecting hydrogen gas from the cathode compartment.

6. The method of claim 5, where the sulfuric acid has a concentration of from about 40 wt.% to about 80 wt.%, and a higher pressure is maintained in the cathode compartment than in the anode compartment.

7. The method of claim 5, where the electrolysis cell operates at a temperature of from about 20° C. to about 70° C., major amounts of aqueous hydriodic acid are fed into the anode compartment, and the anode and cathode contain a suitable catalyst.

8. An electrolysis cell operating by the method of claim 5.

9. The method of claim 6, where the weight ratio of (HI):($H_2SO_4$) is from about (1):(1.5 to 200).

10. A method of recovering hydrogen gas in an electrolysis cell having an electrical energy source and an anode and a cathode, said anode and cathode being separated by a hydrogen ion permeable membrane to form an anode compartment and a cathode compartment respectively, each compartment containing aqueous sulfuric acid, which method comprises:

adding a mixture consisting of: aqueous hydriodic acid having a concentration of from about 0.03 molal to about 2.0 molal and consisting of hydrogen cations and iodide anions; aqueous sulfuric acid; and water to the anode compartment of said electrolysis cell;

electrochemically liberating iodine by anodization of said iodide anions in the anode compartment in the presence of aqueous sulfuric acid, accompanied by a migration of said hydrogen cations across the hydrogen ion permeable membrane to the cathode compartment;

electrochemically generating hydrogen gas at the cathode, in the presence of aqueous sulfuric acid, from said hydrogen cations;

removing and collecting hydrogen gas from the cathode compartment;

removing $H_2SO_4$ and water along with iodine from said anode compartment of the electrolysis cell and contacting them with gaseous $SO_2$ in a separate reactor, to provide aqueous HI and aqueous $H_2SO_4$ in an exothermic reaction also providing heat energy;

feeding the aqueous HI and aqueous $H_2SO_4$ from said separate reactor into an evaporator, to provide aqueous $H_2SO_4$, and gaseous HI and gaseous $H_2O$;

feeding said gaseous HI and gaseous $H_2O$ from the evaporator into a condenser, to provide aqueous HI and aqueous $H_2O$, which are then fed back into the electrolysis cell; and splitting the aqueous $H_2SO_4$ from the evaporator into a major stream, which is then fed into the electrolytic cell, and a minor stream which is then fed into a decomposition reactor, to provide gaseous $H_2O$, gaseous $O_2$ and gaseous $SO_2$, said $SO_2$ being then fed to react with $H_2SO_4$ and iodine removed from the electrolysis cell.

* * * * *